INVENTORS
Walter G. Harrison
Leo A. Gary
Allan C. Audet
by McDougall, Hersh y Scott
Attys : 3,339,699
Patented Sept. 5, 1967

3,339,699
ARTICLE FEEDING MEANS FOR CONVEYORS
Walter G. Harrison, Westchester, Leo A. Gary, Chicago, and Allan C. Audet, Arlington Heights, Ill., assignors to The Spra-Con Company, Chicago, Ill., a corporation of Illinois
Filed Apr. 19, 1965, Ser. No. 449,203
5 Claims. (Cl. 198—23)

This invention relates to a mechanism for locating articles in a proper position on a conveyor. In particular, the invention is concerned with a structure for automatically feeding articles to a conveyor whereby the position of the articles on the conveyor will be precisely the position necessary for proper operations of the conveyor.

The development of conveyor constructions which include automatic article discharging systems is well known. Such systems usually include endless conveyors which move adjacent to a plurality of discharge stations. Articles are placed on a conveyor at a loading station and suitable coding means are provided whereby the articles will be discharged automatically when they arrive at a selected one of the discharge locations. An example of a system of this nature is set forth in Speaker Patent No. 3,034,665.

Specific constructions of the type disclosed in the aforementioned patent include individual trays which carry the articles to be discharged at the various locations. When an article is placed on a tray, a code is assigned to the article and the tray is adapted to automatically tilt to discharge the article in accordance with the pre-assigned code. Other systems also include individual article carrying mechanisms comparable to trays which have discharge capabilities.

Certain problems arise with regard to placing of articles onto the individual trays. It is inefficient to provide for manual location of articles due to the general lack of efficiency, particularly from the standpoint of accuracy and speed of operation. Mechanical means which are employed for locating articles are often unduly complicated and expensive, and in addition, existing mechanical devices are often characterized by operations which tend to damage more fragile articles. Thus, in certain instances, articles are actually thrown by mechanical devices onto a conveyor tray, and this is generally considered undesirable, for example in the handling of fragile parcels.

It is an object of this invention to provide a highly efficient and economical construction for use in association with conveyors whereby articles can be accurately and reliably fed to the conveyor.

It is an additional object of this invention to provide a construction of the type described which operates without rough handling of articles to be transferred.

These and other objects of this invention will appear hereinafter and for purposes of illustration, but not of limitation, specific embodiments of the invention are shown in the accompanying drawings in which:

FIGURE 1 comprises a side elevational view of a conveyor feeding structure characterized by the features of this invention;

FIGURE 2 comprises a sectional view of the structure taken about the line 2—2 of FIGURE 1;

The construction of this invention generally comprises a stationary table which is situated above the path of movement of a conveyor. A pusher means is located adjacent the table, and this pusher means includes elements which are adapted to move over the surface of the table for pushing articles placed on the table toward the discharge end thereof. Since the conveyor is moving beneath the table, the articles discharged will drop onto the conveyor due to the action of the pusher elements. A critical feature of the instant invention relates to the driving action which is imparted to the pusher means by the conveyor. Thus, the moving conveyor transmits driving forces to the pusher means whereby their respective movements can be synchronized so that articles deposited on the conveyor by the pusher means can be deposited in accordance with a predetermined pattern.

Figure 1:
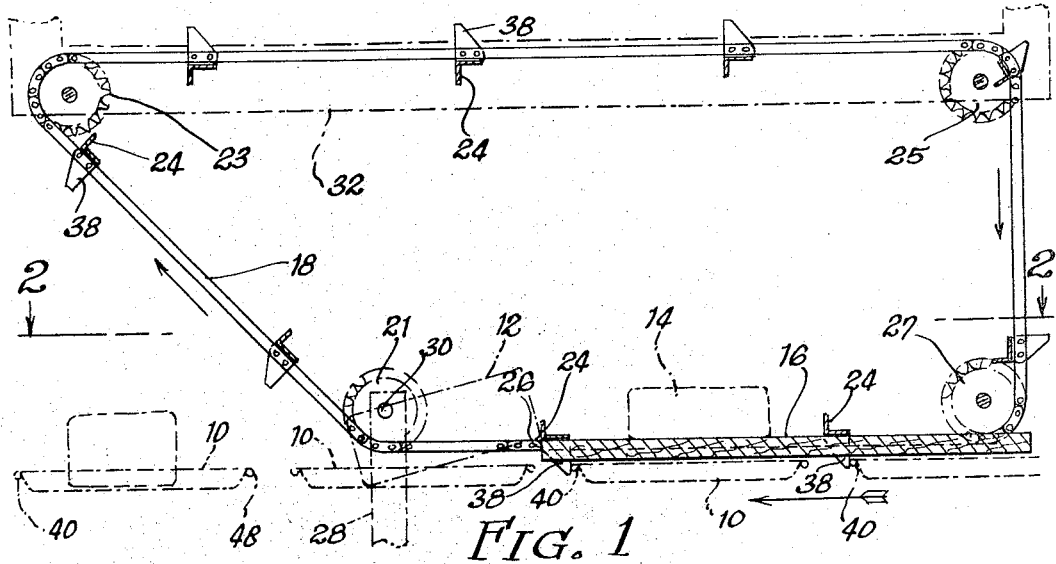
Figure 2:
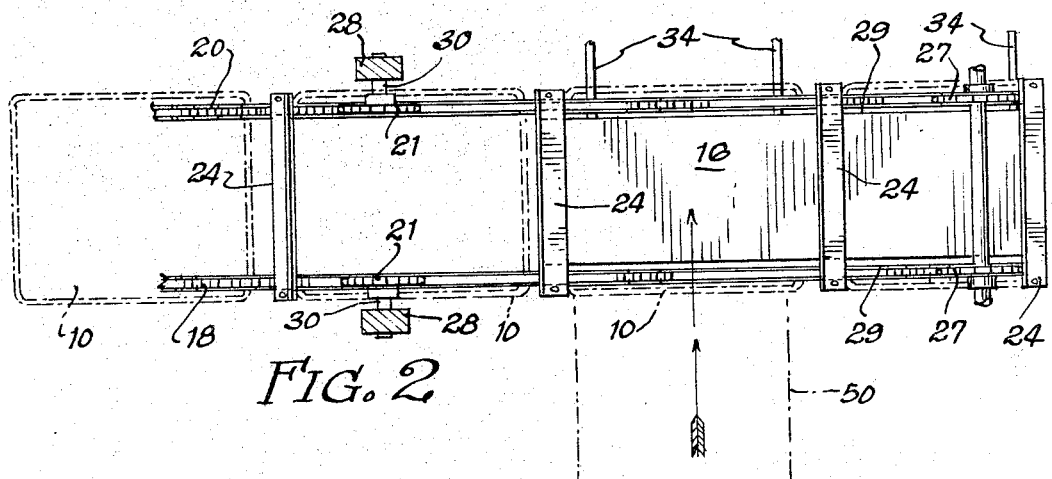

In the drawings, FIGURES 1 and 2 illustrate schematically a plurality of conveyor trays 10 which are adapted to be utilized in combination with the construction of this invention. Any suitable tray arrangement or other conveyor arrangement can be employed, and reference is made to Harrison et al. Patent No. 3,167,192 and to the aforementioned Speaker patent for typical examples of suitable conveyor constructions.

The construction of this invention is designed for depositing articles such as shown at 12 and 14 onto conveyor trays 10. The construction includes a table 16 which is located in stationary relationship with respect to the conveyor trays. A pair of endless chains 18 and 20 are carried by sprockets 21, 23, 25 and 27. The arrangement provides an endless path of movement for the chains with the chains sweeping alongside the edges 29 of the table 16 (see FIGURE 3).

A plurality of pusher elements 24 are attached at each end to the chains 18 and 20. These elements are located at spaced intervals along the chains, and they pass directly over the top of the table 16. It will be apparent that movement of the chains will result in contact of an element 24 with an article resting on the table 16 whereby the elements 24 operate to push articles toward the discharge end 26 of the table. When a tray 10 is in position below the discharge end, the article will be deposited on the tray.

The construction of this invention can be readily arranged in association with virtually any type of conveyor construction. In a typical embodiment, posts 28 are located on either side of the conveyor path, and these posts support shafts 30 carrying sprockets 21. In this connection, it will be noted that the shafts 30 cannot extend between the sprockets 21 due to the fact that such shaft would interfere with the passage of articles on the trays 10. The arrangement illustrated permits handling of articles of substantial height.

An overhead support in the form of beam 32 is provided for sprockets 23. Suitable cantilever support for the table 16 can be provided by rods 34. Obviously, many suitable arrangements for properly supporting the construction illustrated will be apparent to those skilled in the art.

Figures 3, 4:
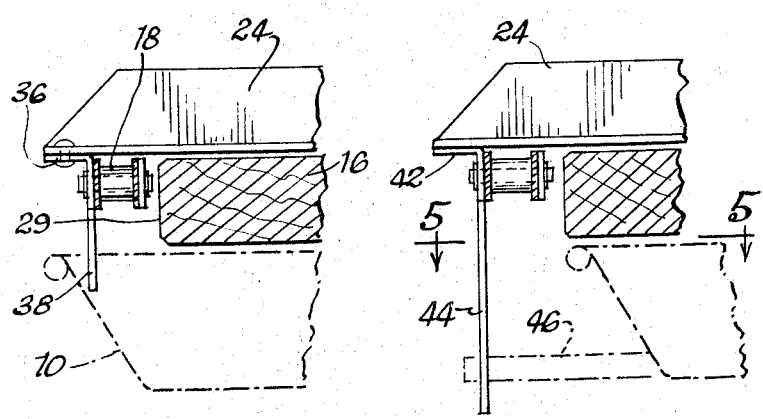
FIGURE 3 is an enlarged fragmentary view illustrating one means for achieving driving action for the feeding mechanism.
FIGURE 4 is an enlarged fragmentary view illustrating an alternative means for achieving driving action for the feeding mechanism; and, FIGURE 5 is a sectional view taken about the line 5—5 of FIGURE 4.

As indicated, it is important to provide for discharge of articles from the table 16 when a conveyor tray is properly located for receiving an article. FIGURE 3 illustrates one arrangement for achieving this purpose. In this system, each of the elements 24 is attached to the chain 18 by means of a bracket 36. This bracket includes a downwardly extending portion 38 and, as best shown in FIGURE 1, the leading edge 40 of a tray 10 is adapted to engage this portion 38. The conveyor trays 10, when driven by conventional drive means will thus provide the driving force for the chains 18 and 20 as well as for the associated pusher elements 24. The extent of the pusher elements and the spacing of the trays 10 are suitably controlled whereby an article will necessarily fall onto a tray when a pusher element moves the article into position.

Figure 5:
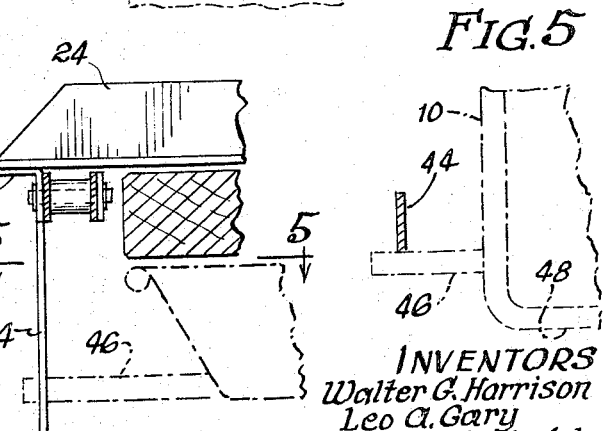

FIGURES 4 and 5 illustrates an alternative arrangement wherein a bracket 42 is attached to each element 24. The bracket 42 includes a downwardly extending portion 44 which is adapted to engage pins 46 carried by the trays 10. These pins are located adjacent the trailing edge 48 of each tray. Accordingly, the pusher elements will at all times overlap the tray into which the article pushed by the element is to be deposited. This arrangement completely avoids the possibility of very small articles dropping between trays in the conveyor system as could conceivably happen with the arrangement shown in FIGURE 1.

The passage of articles onto the table 16 can be accomplished in a variety of ways, and in this connection, manual loading of the table is contemplated. It is also contemplated, however, that a conveyor belt such as shown diagrammatically at 50 in FIGURE 2 could be employed for automatically loading articles onto the table 16. A suitable conveyor belt system for this purpose is desirable in Harrison et al. Patent No. 3,140,771.

It will be understood that various changes and modifications may be made in the above described construction which provide the characteristics of this invention without departing from the spirit thereof, particularly as defined in the following claims.

That which is claimed is:

1. A construction for delivering articles to a conveyor comprising a table situated above the path of movement of the conveyor, said table defining an article supporting surface positioned substantially parallel with the article carrying surface of the conveyor and defining a discharge end with the conveyor moving beneath said discharge end, and endless pusher means located above said table and movable adjacent said table, said pusher means including pusher elements attached to the pusher means in spaced apart relationship with respect to each other, said elements traversing said table for pushing articles along the table surface and toward said discharge end and then onto said conveyor, and means operatively connecting said conveyor and said pusher means for moving the pusher means in response to movement of the conveyor, and wherein said conveyor comprises a plurality of individual, spaced-apart trays, and including means associated with said pusher means extending into the path of movement of said trays as the trays move beneath said table, said last mentioned means operatively engaging said trays whereby the pusher means move in response to movement of the trays.

2. A construction for delivering articles to a conveyor comprising a table situated above the path of movement of the conveyor, said table defining a discharge end with the conveyor moving beneath said discharge end, and endless pusher means movable adjacent said table, said pusher mean including pusher elements attached to the pusher means in spaced apart relationship with respect to each other, said elements traversing said table for pushing articles toward said discharge end and onto said conveyor, and means operatively connecting said conveyor and said pusher means for moving the pusher means in response to movement of the conveyor, and wherein said conveyor defines a plurality of separate conveyor sections, and including means associated with said pusher means adapted to be engaged by elements associated with said conveyor sections whereby the pusher means move in response to movement of the conveyor sections, and wherein said pusher means includes endless chain means supporting said pusher elements, said chain means comprising a pair of endless chains mounted for movement in the direction of movement of the conveyor at both sides thereof, and said pusher elements comprising bars extending between the respective chains.

3. A construction in accordance with claim 2 wherein said conveyor comprises a plurality of individual trays, and including means carried by at least one of said chains for engagement with a tray whereby the tray movement imparts driving action to the chains.

4. A construction in accordance with claim 3 wherein the path of movement of said one chain is within the lateral extent of the trays, and including means extending downwardly from said one chain for engagement with the leading edge of a tray to provide for said driving action.

5. A construction in accordance with claim 3 including means associated with the individual trays adjacent the trailing edge thereof for engagement with additional means associated with said chain to provide said driving action.

References Cited

UNITED STATES PATENTS

| 2,701,399 | 2/1955 | Underwood et al. | 198—203 |
| 2,756,862 | 7/1956 | Creed | 198—23 X |

EVON C. BLUNK, *Primary Examiner.*

HUGO O. SCHULZ, *Examiner.*

R. J. HICKEY, *Assistant Examiner.*